United States Patent [19]
Akiyama

[11] Patent Number: 5,289,457
[45] Date of Patent: Feb. 22, 1994

[54] DISC CARTRIDGE WITH BENT SPRING DESIGN FOR CLOSING A CLOSURE SHUTTER

[75] Inventor: Noboru Akiyama, Kyoto, Japan

[73] Assignee: Dai Nippon Insatsu Kabushiki Kaisha, Yokyo, Japan

[21] Appl. No.: 964,093

[22] Filed: Oct. 21, 1992

Related U.S. Application Data

[60] Division of Ser. No. 835,065, Feb. 18, 1992, abandoned, which is a continuation of Ser. No. 344,580, Apr. 28, 1989, abandoned.

[30] Foreign Application Priority Data

| Apr. 28, 1988 | [JP] | Japan | 63-56766 |
| Apr. 28, 1988 | [JP] | Japan | 63-56767 |
| Apr. 28, 1988 | [JP] | Japan | 63-56768 |
| Apr. 28, 1988 | [JP] | Japan | 63-56772 |
| Jun. 29, 1988 | [JP] | Japan | 63-85101 |

[51] Int. Cl.$^5$ .................................. G11B 23/03
[52] U.S. Cl. ..................... 369/291; 360/133
[58] Field of Search ............ 369/291; 360/133; 206/444

[56] References Cited

U.S. PATENT DOCUMENTS

| 4,550,354 | 10/1985 | Wakabayashi et al. . |
| 4,589,105 | 5/1986 | Nemoto et al. . |
| 4,698,714 | 10/1987 | Sugawara et al. . |
| 4,740,948 | 4/1988 | Nakamori et al. . |
| 4,755,982 | 7/1988 | Douwes . |
| 4,785,369 | 11/1988 | Ommori et al. . |
| 4,799,121 | 1/1989 | Takahashi . |
| 4,849,844 | 7/1989 | Kato . |
| 4,853,817 | 8/1989 | Mizuta et al. . |
| 4,908,817 | 3/1990 | Sandell et al. ............... 369/291 |
| 4,926,411 | 5/1990 | Ouwerkerk et al. . |
| 4,935,834 | 6/1990 | Muehlhausen . |
| 4,943,880 | 7/1990 | Muehlhausen et al. . |
| 5,040,167 | 8/1991 | Tanaka et al. ............... 369/291 |
| 5,065,391 | 11/1991 | Funaki . |
| 5,097,978 | 3/1992 | Eckerd . |

FOREIGN PATENT DOCUMENTS

| 0244132 | 11/1987 | European Pat. Off. . |
| 0248908 | 12/1987 | European Pat. Off. . |
| 0264237 | 4/1988 | European Pat. Off. . |
| 57-154685 | 9/1982 | Japan . |
| 63-046669 | 2/1988 | Japan ............... 360/133 |
| 63-269385 | 11/1988 | Japan ............... 360/133 |

Primary Examiner—Stuart S. Levy
Assistant Examiner—Paul J. Ditmyer
Attorney, Agent, or Firm—Sughrue, Mion, Zinn, Macpeak & Seas

[57] ABSTRACT

A cartridge case for encasing therein a recording medium disc. The cartridge case includes a shutter which is slidably mounted thereon for opening/closing at least one head insertion hole formed in the cartridge case, a guide portion formed in the front edge of the cartridge case in an insertion direction toward a recording and reproducing apparatus, a slider slidingly engaged with the guide portion for supporting the shutters and a return coil spring for biasing the shutter through the slider to a position where the shutter closes the head insertion hole. The spring includes an elastic wire coiled portion and two arms which extend therefrom. One of the arms includes a first extension portion extending substantially along a circumferential periphery of the disc from the coiled portion and a second extension portion bent from the first extension portion along a front wall in the insertion direction of the recording and reproducing apparatus.

2 Claims, 11 Drawing Sheets

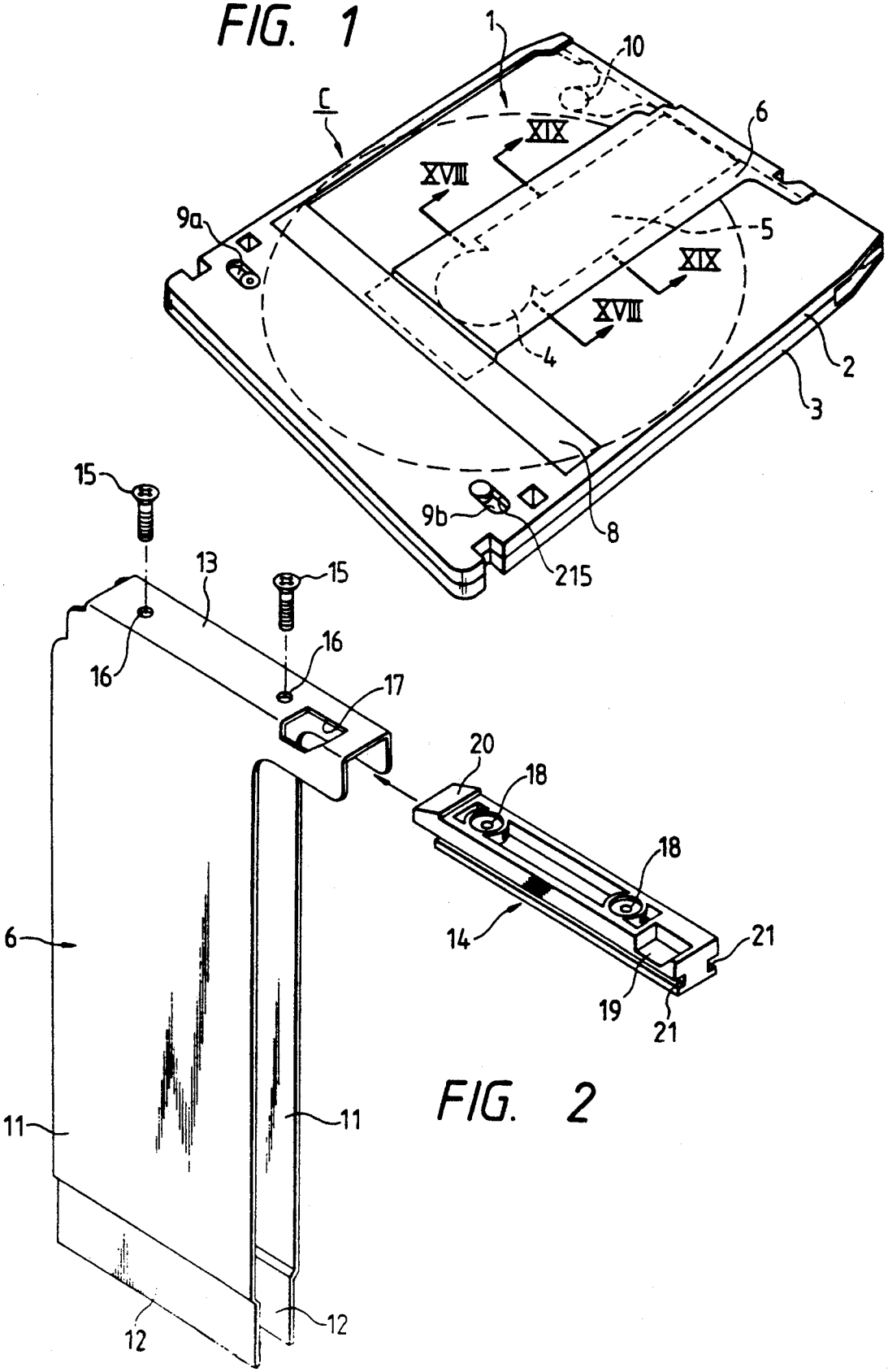

DISC CARTRIDGE WITH BENT SPRING DESIGN FOR CLOSING A CLOSURE SHUTTER

This is a division of application Ser. No. 07/835,065, filed Feb. 18, 1992, now abandoned, which in turn is a continuation of application Ser. No. 07/344,580, filed Apr. 28, 1989, now abandoned.

BACKGROUND OF THE INVENTION

The present invention relates to a disc cartridge for encasing a recording medium such as an optical disc or a magnetic disc.

In general, a magnetic disc or an optical disc is encased in a cassette case made of two shell halves. A hole into which a spindle for rotating the disc is to be inserted is formed in a central portion of the cassette case. Head insertion holes into which a write and read head is to be inserted is formed in the cassette case so as to extend in the radial direction to traverse the recording surface of the disc.

Such a disc cartridge is shown in, for example, Japanese Utility Model Unexamined Publication No. 62-168176. This cartridge has a shell for encasing the disc. A spindle hole is formed in the central portion of the shell half. A hub formed in the central portion of the disc is located in the spindle hole of each shell half. The spindle of the recording and reproducing apparatus is to be located at the hub which is sucked by a turntable.

The head insertion holes are formed on an insertion side of the cartridge relative to the recording and reproducing apparatus. A write and read head (pickup head) is inserted into one of the head insertion holes. The head insertion holes are closed and opened by sliding movement of the shutter.

The shutter is bent at its intermediate portion so as to extend to the top and bottom of the cartridge to cover the head insertion holes and two spindle holes. On the insertion side of the cartridge into the recording and reproducing apparatus, the shutter is slidingly moved along a guide portion of the cartridge front edge to open and close the insertion holes and the spindle holes.

However, it is general that the shutter is made of metal, whereas the cartridge is made of plastic. Therefore, when the shutter is frequently moved on and along the cartridge, frictional or abraded chips are generated due to the sliding movement between the metal and plastic. The chips would enter through the openings of the cartridge into the interior thereof to stick or adhere to the disc.

Also, the sliding movement of the shutter of the conventional cartridge is not smooth, which would lead nonsmooth sliding contact between the shell and the shutter.

SUMMARY OF THE INVENTION

An object of the invention is to provide a disc cartridge in which a shutter for opening and closing head insertion holes and spindle holes into which a spindle is to be inserted is smoothly slidingly moved on the cartridge, and friction or wear chips may be reduced as much as possible to thereby avoid the contamination of the disc.

According to the present invention, there is provided a disc cartridge comprising: a cartridge case for encasing therein a recording medium disc, said cartridge being made of plastic; a shutter slidably mounted on said cartridge case for opening and closing at least one head insertion hole formed in said cartridge case; a guide portion formed in a front edge of said cartridge case in an insertion direction toward a recording and reproducing apparatus; and a slider slidingly engaged with said guide portion, said slider being formed of plastic, said shutter being fixed to said slider.

BRIEF DESCRIPTION OF THE DRAWINGS

In the accompanying drawings:

FIG. 1 is a perspective view showing a disc cartridge according to the invention;

FIG. 2 is a perspective view showing a shutter and a slider used in the cartridge; shown in FIG. 1;

DETAILED DESCRIPTION OF THE PREFERRED EMBODIMENTS

Figure 3:
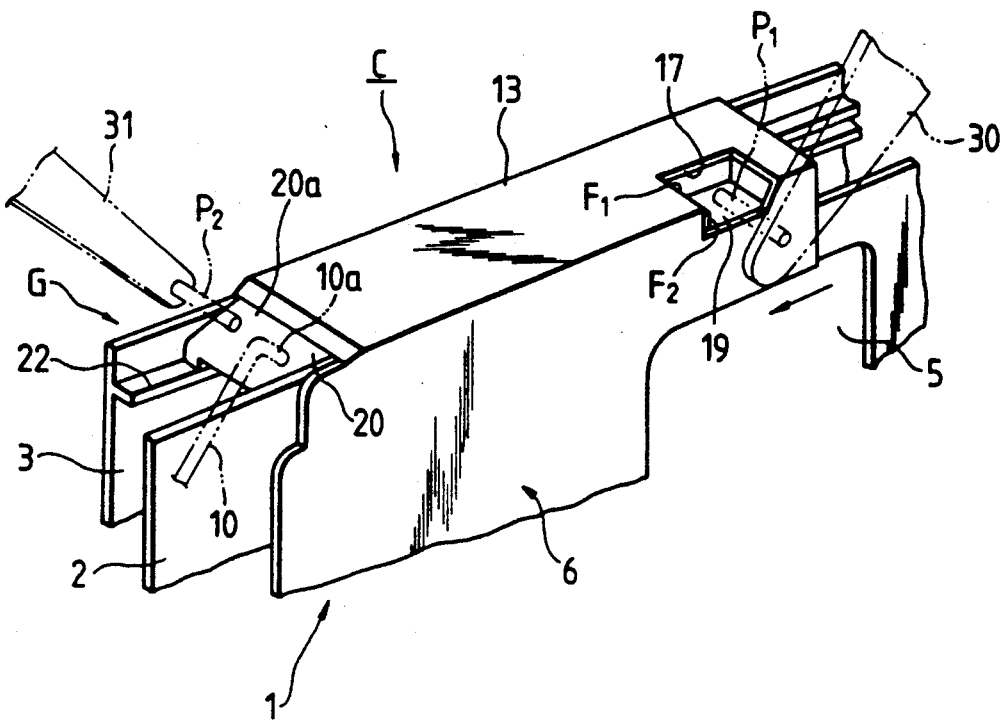
FIG. 3 is a perspective view showing a guide portion shown in FIG. 1.

The present invention will now be described with reference to the accompanying drawings.

In FIG. 1, a cartridge C for an optical disc according to the invention has a cartridge case I which is composed of upper and lower shell halves 2 and 3 in alignment with each other. A spindle hole 4 is formed in the central portion of the case 1, the spindle hole 4 being integrally formed with a head insertion hole 5. A lower end of the shutter 6 is guided by a retainer plate 8.

Double writing preventing portions 9a and 9b are provided on the right and left sides on the rear edge side in the insertion direction to the recording and reproducing apparatus for the cartridge C. A shutter 6 is bent at the front edge of the case I to extend to the bottom side.

A return coil spring 10 is encased on the left side of the case 1, so that the shutter 6 is biased in the direction to close the holes 4 and 5.

The shutter plate 6 is formed of a single metal sheet such as a stainless plate as shown in FIG. 2. A shutter 6 is provided with two planar plates 11, 11 confronted with each other and a head portion 13 defined by a connecting portion of the planar plates 11, 11.

A glide portion is formed in a lower portion of each planar plate 11 so as to slidingly engage with the retainer plate 8. The head portion 13 is fixed by screws 15, 15 for covering an elongated slider 14. The screws 15, 15 are threadedly engaged with receiving holes 18, 18 of the slider 14 through openings 18, 18. An opening and closing pin receiving hole 17 into which an opening and closing pin P1 is formed on a drive side of the recording and reproducing apparatus is inserted is formed in a tail portion of the head portion 13 (FIG. 3). A receiving recess 19 is formed in the slider 14 corresponding to the opening and closing pin receiving hole 17. The opening and closing pin P1 mounted on an arm 30 as shown in FIG. 3 is engaged with the receiving recess 19.

Guide grooves 21, 21 (FIG. 2 and 5) are formed in both sides of the slider 14 and are adapted to engage with guide rails 22, 22 (FIG. 2) formed in a guide portion G formed at a front edge of the cartridge C on the recording and reproducing side as shown in FIG. 3.

A slanted surface 20 is formed at a front face of the slider 14. The slanted surface 20 serves to assist a smooth passage of an opening and closing pin P2 mounted on an arm 31 on the drive side of the recording and reproducing apparatus as shown in FIG. 3.

Figure 4:
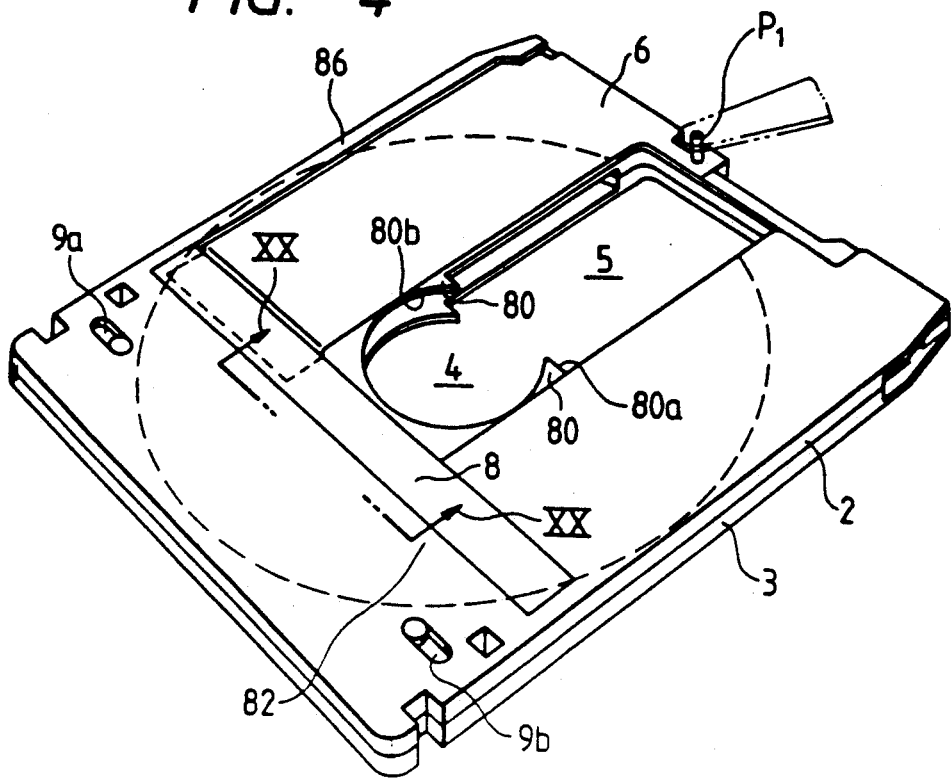
FIG. 4 is a perspective view showing the disc cartridge from which the slider has been removed.

When the cartridge is inserted into the recording and reproducing apparatus, one of the opening and closing pins P1 and P2 is inserted into the receiving recess 19 of the slider 14 and the receiving hole 17 of the shutter 6. When the opening and closing pin P1 moves the shutter 6 leftwardly to open the spindle holes 4 and the head insertion holes 5 as shown in FIG. 4, the other opening and closing pin P2 rides over and along the slanted surface 20 of the slider 14 so that the pins P1 and P2 cross with each other. Thus by pins P1 and P2 cross with each other. Thus, by providing the slanted surface 20 on the slider 14, a so-called disposal pin, i.e., the unnecessary opening and closing pin P2 is smoothly guided.

As described above, the slider 14 is engaged with the guide portion G at the front edge of the cartridge C on the recording and reproducing apparatus side, and the shutter 6 is held to the slider 14. Therefore, when the shutter 6 is frequently moved by the opening and closing pin P1 for the opening and closing operation, the slider 14 made of plastic is engaged with a guide portion G made of plastic, so that any cut chips will not be generated by the sliding contact therebetween. Thus, there is no fear that the disc would be contaminated. Also, even if the cartridge C is protect the shutter 6. Thus, the shutter 6 is prevented effectively from being separated apart from the cartridge.

Figure 5:
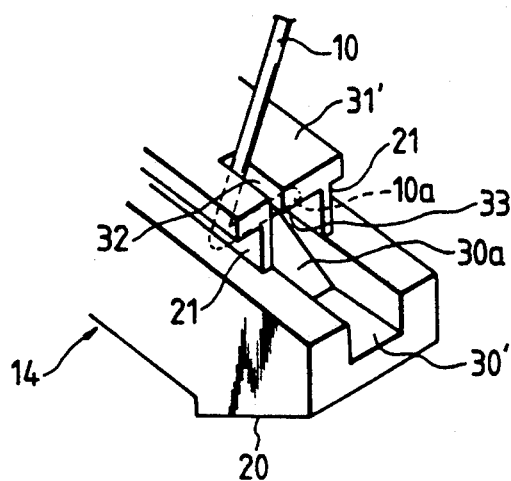
FIG. 5 is a partial perspective view showing an end portion of the slider shown in FIG. 1.

At the front face of the slider 14 on which the slanted surface 20 is formed, there is formed a recess 30' as shown in FIG. 5. A slanted surface 30a is formed in an inner side of the recess 30'. A distal end 10a of the coil spring 10 is retained in a receiving portion 33 on the inner side of the slanted surface 30a. The distal end 10a of the coil spring 10 is received on the slanted surface 30a through a cutout 32 formed in a planar portion 31' of the slider 14.

Figure 6:
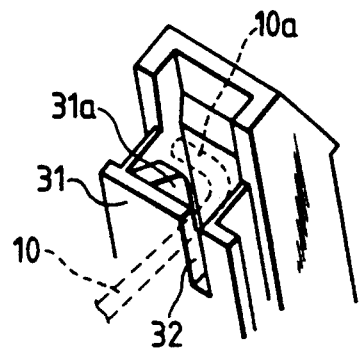
FIG. 6 Is another partial perspective view showing the end portion of the slider.
Figure 7:
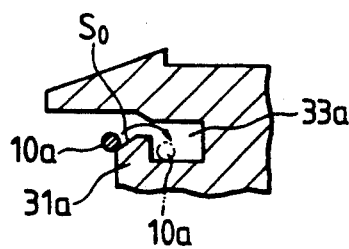
FIG. 7 is a partial cross-sectional view showing the end portion of the slider.

Also, as shown in FIGS. 6 and 7, a projection 31a is formed on an inner surface of the planar portion 31' and the distal end 10a of the coil spring 10 extends through the cutout 32. The projection 31a has a slanted surface So. The projection 31a serves to smoothly guide the distal end 10a into a receiving portion 33a and simultaneously to retain the distal end 10a at the receiving portion 33a against the collision transmitted from the outside.

Figure 8:
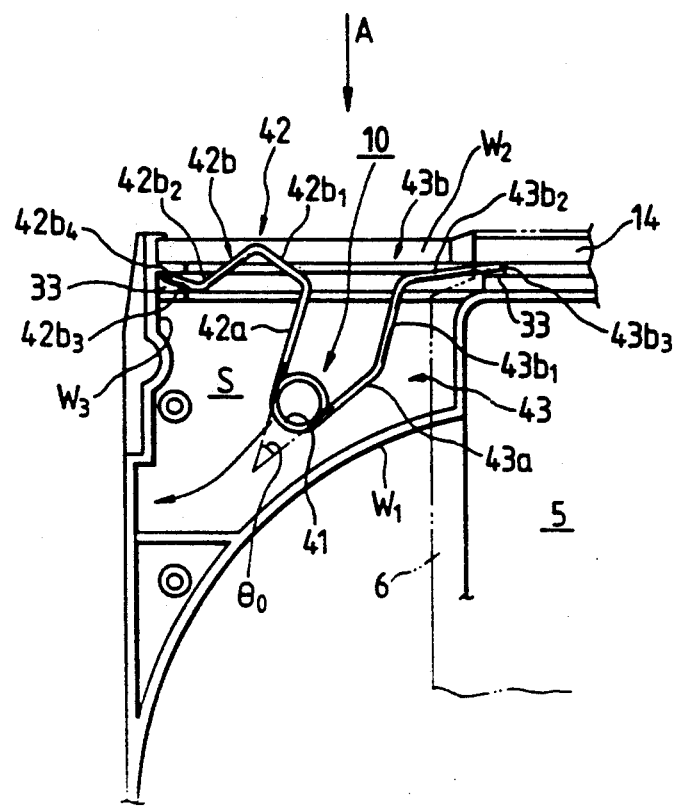
FIG. 8 is a partial plan view showing a corner portion of the cartridge.
Figure 9:
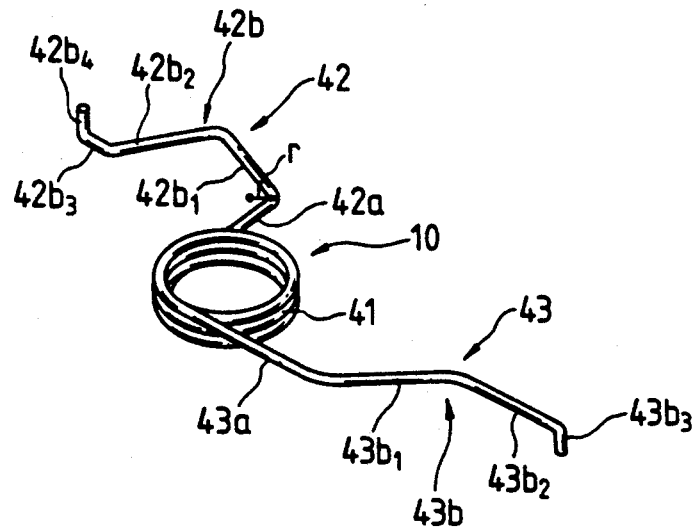
FIG. 9 is a perspective view showing a return coil spring shown in FIG. 8.

As shown in FIG. 8, a receiving space S for the return coil spring 10 is substantially in the form of a rectangular shape. As shown in FIGS. 8 and 9, the coil spring 10 is composed of a coiled elastic portion 41, and two arms 42 and 43 extending laterally from the coiled portion 41. The arm 43 is composed of a first extension portion 43a extending substantially along a peripheral wall W1 formed around a circumferential edge of the optical disc (not shown) in the case 1, and a second extension portion 43b extending from the first extension portion 43a along the front edge wall W2 of the cartridge. The second extension portion 43b is composed of a longitudinal portion 43b1, a laterally extending portion 43b2 bent from the portion 43b1 in the horizontal direction, and a retainer portion 43b3 engaged with an end portion of the slider 14 and bent at a right angle from the laterally extending portion 43b2 for guiding the shutter 6.

Also, the arm 42 is composed of a third extension portion 42a extending toward the front wall of the cartridge from the coiled portion 41, and a fourth extension portion 42b extending generally in the lateral direction from the third extension portion 42a. The fourth extension portion 42b is composed of crest-shape forming portions 42b1 and 42b2 for forming the crest shape on the left side in FIG. 9 extended from the third extension portion 42a, a jump portion 42b3 extending toward the front wall W2 of the cartridge from the crest-shape forming portion 42b2, and a retainer portion 42b4 extended from the jump portion 42b3 and curved at a right angle for engaging with a end wall W3 of the cartridge.

Figure 10:
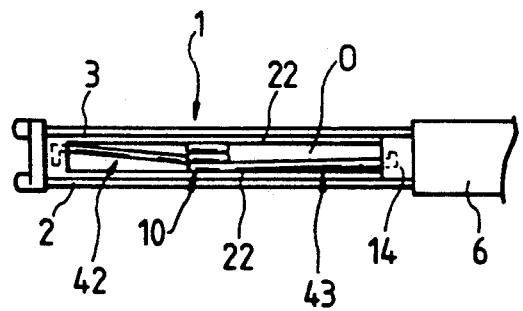
FIG. 10 is a side elevational view showing the received condition of the return coil spring.

FIG. 10 is a view as viewed in the direction indicated by the arrow A in FIG. 8. In FIG. 10, the slider 14 is moved along the guide rails 22, 22 of the halves 2, 3. An opening O is formed In a front face of the upper and lower halves 2 and 3. The coil spring 10 is inserted from the opening O while the one end of the spring 10 is being engaged with the side wall W3 by the end of the slider 14 in the final step of the assembling operation. In other words, receiving portions 33, 33b for detachably receiving the spring retainer portions 42b4 and 43b3 are formed in the slider end portion and the side wall W3, respectively.

Figure 11:
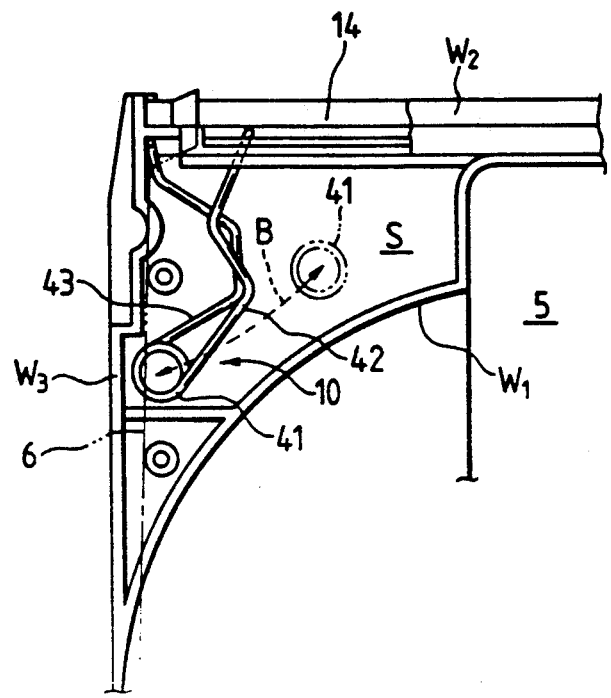
FIG. 11 is a view showing the state of the return coil spring when the shutter is opened.

When the shutter 6 opens and closes the head insertion holes 5, as shown in FIG. 11, the central portion of the coiled portion 41 of the spring 10 is reciprocatingly moved along a locus B. In other words, the coiled portion 41 is moved along the circumferential wall W1 without colliding against the latter W1. Also, since the arms 42 and 43 are bent as described above, the coiled portion 41 is swayed in the lateral direction in accordance with the leftward movement of the slider 14, so that the reduction in opening angle $\theta_0$ (see FIG. 8) defined by the arms 42 and 43 may be kept at a low level even if the distance of the lateral movement of the slide 14 is increased. Accordingly, there is no fear that the spring resistance would be abruptly increased in accordance with the movement of the slider 14. Thus, the smooth movement of the shutter 6 is ensured. Also, because of the formation of the bent arms, even if the shutter 6 is opened to a position close to the side wall W3, there is no fear that the arm 43 would be brought into contact with the side wall W3 to hinder the movement of the slider 14. Accordingly, even if the receiving space S is relatively small, it is possible to increase the distance of the lateral movement of the shutter 6.

Since the return spring 10 is structured as described above, even if the receiving space S for the return coil spring is small, it is possible to increase the movement range of the shutter, thereby making the cartridge more compact and ensuring the smooth and large opening and closing operation of the shutter.

Incidentally, it is preferable that a radius r at the bent portion between the crest shaped portion 42b1 and the third extension portion 4a be in the range of 0.8 to 3 mm. When the coil spring 10 was made of SUS304WPB and the radius r was set in the above-described range, the coil spring could function normally after repeated opening and closing operations of the shutter over 100,000 times. If the radius r would be too small, the durability would be lowered, whereas if the radius r would be too large, the movement during the expansion and compression of the spring would be changed according to every spring. In the latter case, it would be difficult to control the spring property in a prescribed manner.

Figure 12:
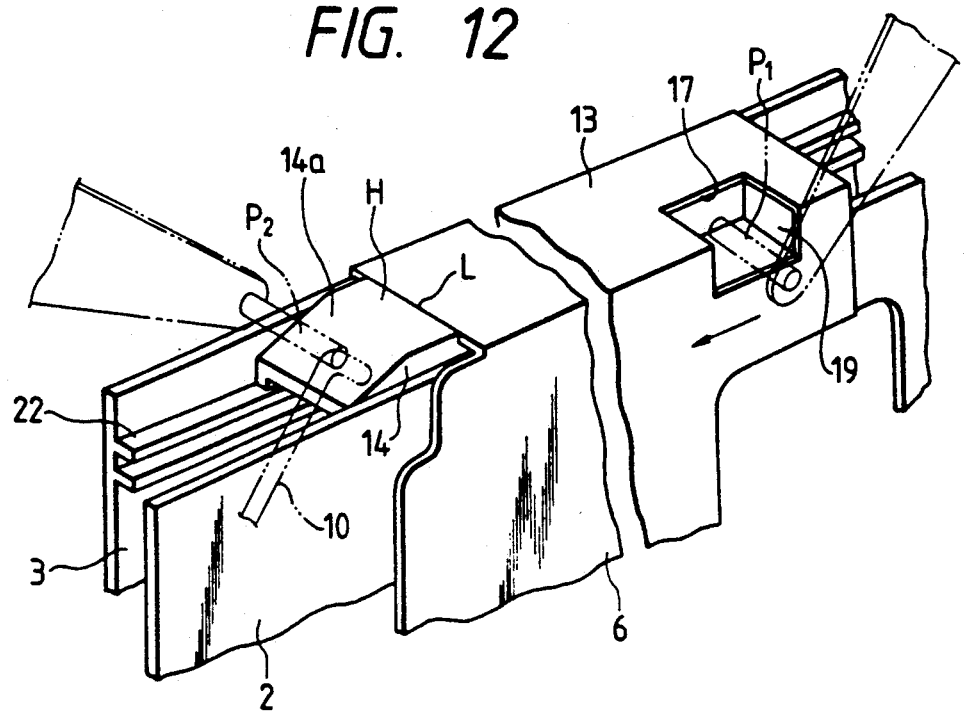
FIG. 12 is a perspective view showing a slider in accordance with another embodiment.

An end of the slider 14 in the extension direction is projected from a front face of the head portion 13 of the shutter. The projected portion of the slider 14 is composed of a horizontal portion H extending in a flush manner with the end face of the head portion 13, and a slanted surface 14a lowered gradually from the horizontal portion H (FIG. 12).

Figure 13:
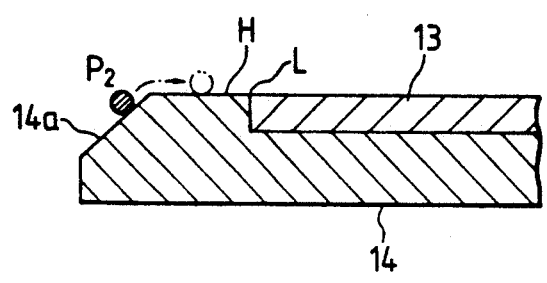
FIG. 13 is a longitudinal sectional view showing the slider shown in FIG. 12.

When the cartridge is inserted into the recording and reproducing apparatus, one P1 of the opening and closing pins P1, P2 thereof is inserted through a cutout 17 of the shutter 6 into the receiving recess 19 of the slider 14. When the opening and closing pin P1 moves the shutter 6 in the leftward direction as shown in FIG. 12 to open the head insertion holes and the spindle insertion holes, the other opening and closing pin P2 is slidingly moved along the slanted surface 14a of the slider 14 toward the head portion 13. In this case, since the horizontal portion H is smoothly continued with the slanted surface 14a and the connection portion L with the shutter 6, the opening and closing pin P2 is raised along the slanted surface and is deflected in the horizontal direction, to pass through the connection portion L. Therefore, the movement of the opening and closing pin P2 is smoothly effected (FIG. 13).

As a result, both the pins P1 and P2 are crossed with each other, so that a so-called disposal pin, i.e., the unnecessary opening and closing pin P2 is smoothly guided. On the contrary, if the slanted surface is connected directly to the connection portion L, the pin P2 is apt to stumble over the connection portion L.

In this embodiment, the slider 14 has a horizontal extension H between the slanted surface 14a and the connection portion L. Accordingly, the pin P2 can pass by the connection portion L in the horizontal direction. Thus, the movement of the opening and closing pin is stably attained so that the shutter movement is also smoothly attained.

The head portion 13 of the shutter 6 is fixed by suitable means such as screw fastening or melt-adhesion, so that the positional relationship between the opening 27 and the recess 19 meets the following requirements.

Figure 14:
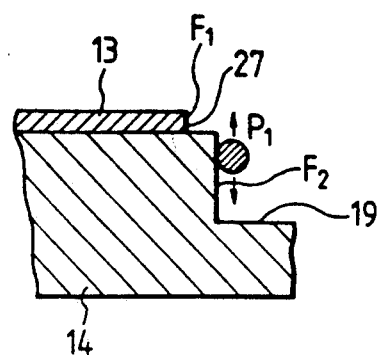
FIG. 14 is a cross-sectional view showing a pin receiving hole of the slider.

Namely, as shown in FIG. 14, a side face F2 on the pressing drive side where the opening and closing pin P1 in the receiving recess 19 moves the slider 14 is located to project from a corresponding drive face F1 of the opening 27, in a direction opposite to a direction in which the opening and closing pin P1 moves the slider 14. Namely, the end face F1 of the opening 27 is located to be retracted from an inlet of the receiving recess 19. With such an arrangement, the opening and closing pin P1 may engage with or disengage from the opening 27 and the recess 19 as desired, as shown in FIG. 14.

As described above, the drive end face F2 of the receiving recess 19 of the slider 14 for engaging with the opening and closing pin P1 of the recording and reproducing apparatus is located to a position projecting from the corresponding cutout surface F1 of the opening 27 in the direction opposite to the direction where the pin P1 moves the shutter 6. It is therefore possible to carry out the engagement and disengagement among the opening and closing pin, the opening 27 and the receiving recess 19. This would lead to the smooth and quick opening and closing operation of the shutter.

Figure 15:
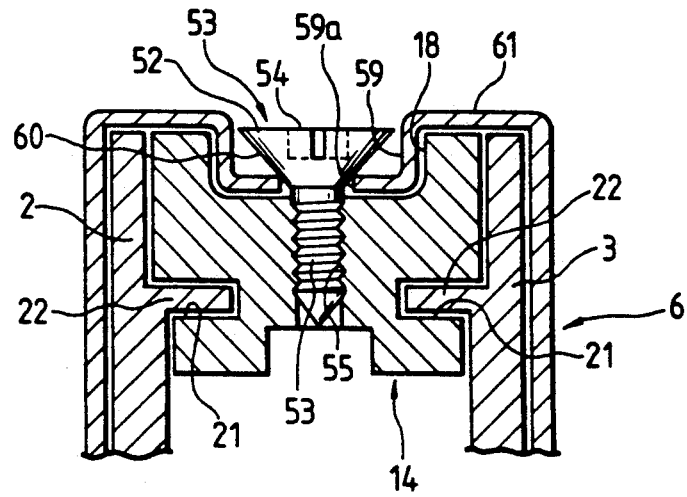
FIG. 15 is a cross-sectional view showing a mounting condition of the shutter and the slider.

FIG. 15 shows a modification to the mounting structure for the shutter 6 shown in FIG. 2. As shown in FIG. 15, the connection portion between the shutter 6 and the slider 14 is so constructed that each engagement projection 59 formed in the shutter 6 is confronted with and engaged with an associated engagement recess 18. In the central portion of the engagement projection 59, there is formed an opening 59a through which a fastening screw 53 is inserted. The screw 53 is composed of a head portion 52 and a threaded portion 53a extending from the head portion 52. The head portion 52 is in the form of an inverted truncated cone having a slanted surface 60. In a top surface of the head portion 52, there is formed a receiving groove into which a crosshead screw is to be inserted.

When the shutter 6 and the slider 14 are coupled to each other, the slider 14 is inserted into a slider connecting portion 61 of the shutter 6, and the engagement projection 59 is engaged with the engagement recess 18 of the slider 14 in confronted relation. At this time, the threaded hole 55 of the slider 14 is in alignment with the opening 59a of the engagement projection 59 in a fixed positional relation. Under this condition, the screw 53 is inserted into the threaded hole 55. Upon the fastening operation of the screw 53, since the slanted surface 60 of the head portion 52 is brought only into contact with a peripheral portion of the opening hole 59a, even if the head portion 52 is firmly fastened, there is no fear that the positional relationship between the slider 14 and the shutter 6 would be displaced.

Only by thus engaging the engagement projection of the slider connecting portion of the shutter and the slider may be kept constant. Furthermore, if the truncated conical headed screw having the slanted surface is used as the fastening screw for fastening the slider connecting portion of the shutter to the slider, there is no fear that the positional relationship in connection between the shutter and the slider would be displaced or offset during the fastening operation of the screw.

Figure 16:
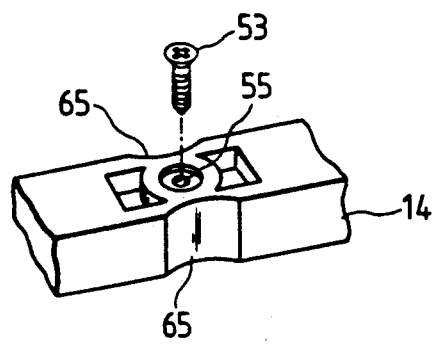
FIG. 16 is a partial perspective view of the modified slider.

Also, when the screw 53 is inserted into the threaded hole 55, the threaded hole 55 would be expanded, resulting in physical expansion of the shutter 6. In order to cope with this defect, it is effective to slightly cut away side walls of the slider 14 to form recesses 65, 65, as shown in FIG. 16.

Figure 17:
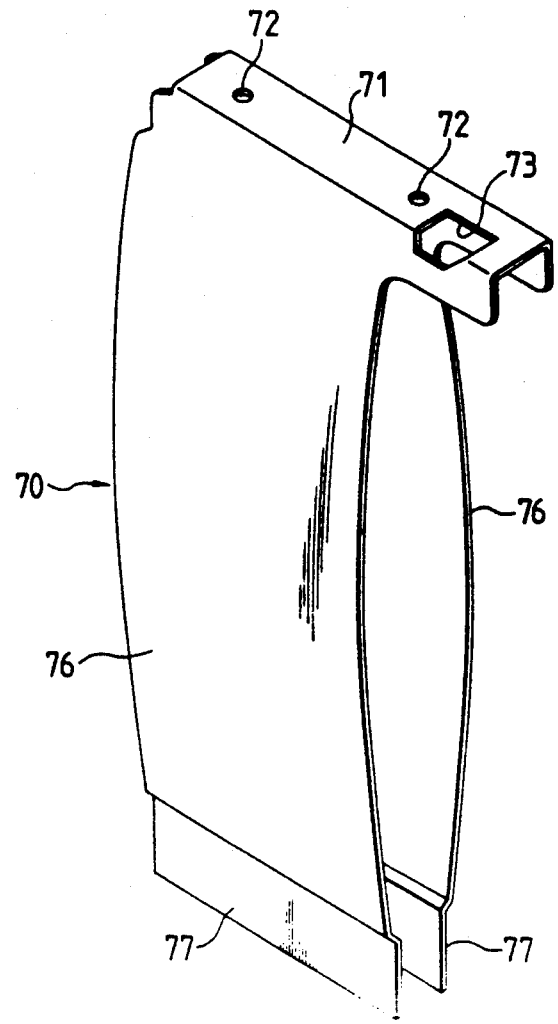
FIG. 17 is a perspective view showing another embodiment of the shutter.

Also, it is possible to modify the shutter shown in FIG. 2 into a shutter shown in FIG. 17. More specifically, the shutter 70 has opening and closing plate portions 76, 76 formed to suspend from a guide plate portion 71. The opening and closing plate portion 76 are in the form of a barrel shape whose central portions are expanded outwardly. Each of the opening and closing plate portions 76 is provided at a lower end with a guide end plate portion 77 which is to be inserted into the retainer plate 8 fixed to the cartridge in the transverse direction.

Since in the shutter 70, the opening and closing plate portions 76 are expanded in an arcuate manner such that the central portions are raised from the sliding surfaces of the cartridge made of plastic within a certain reference level. Accordingly, when the shutter is slidingly moved in the lateral direction, it is possible to effectively prevent any collision between the peripheral surfaces of the spindle holes 4 and the head insertion holes 5 (see FIG. 4) and the side edges of the shutter 76. The generation of frictional chips at the portion may effectively be avoided. It is therefore to prevent the surfaces of the disc from being contaminated.

With such an arrangement of the shutter 70, even if the shutter is frequently opened or closed, it is possible to prevent the generation of the frictional chips upon the collision between the sliding surfaces on the cartridge and the shutter, and to avoid the contamination on the disc surfaces.

Also, the above-described shutters 6, 70 may be dipped into a UV resin (ultraviolet curing resin) to apply a coating to surface of the shutters. The UV resin coating can be applied by other coating methods. This makes it possible to avoid the formation of damages or flaws on the surfaces of the shutters. Furthermore, if the shutters 6, 70 surfaces are subjected to a printing operation and thereafter, the UV resin is applied thereto, the printed surfaces are stable and the print would hardly be diminished.

Figure 18:
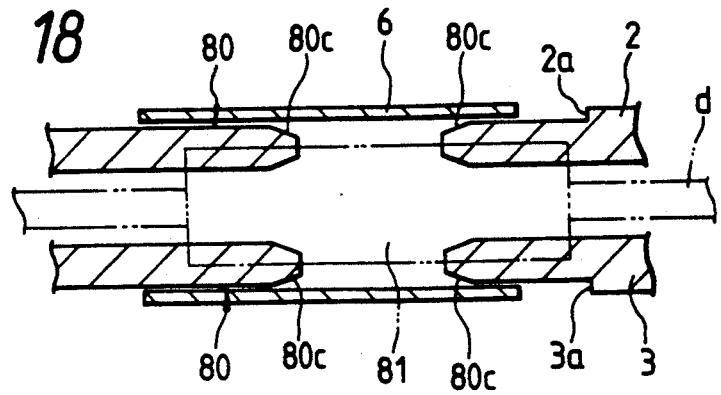
FIG. 18 is a cross-sectional view taken along the line XVIII—XVIII of FIG. 1.

A structure of a connecting portion between the spindle holes 4 and the head insertion holes 5 will now be explained with reference to FIGS. 4 and 18. Projections 80, 80 are extending toward an internal portion of the head insertion holes 5 and the spindle holes 4 in the connection between the holes 4 and 5 as best shown in FIGS. 4 and 18. Each of the projections 80 is substantially in the form of a triangular shape defined by an arcuate side 80b extending along a hub 81 and a right anglular side 80a extending perpendicular to a side edge of the head insertion hole 5. The projections 80 serve to limit the movement of the hub 81 toward the head insertion holes 5 with the arcuate sides 80b.

Each of the projections 80 is bevelled at its distal end to form bevelled portions 80c as shown in FIG. 18. The formation of the bevelled portions 80c makes it possible to effectively avoid the collision between the shutter edges and the projection ends when the shutter 6 is slidingly moved in the lateral direction. Accordingly, the generation of the wear or frictional chips due to the sliding movement between the shutter 6 and the ends of the projections 80 may be prevented, thus preventing the contamination of the recording surfaces of the disc. Thus shutter 6 is made of metal such as stainless steel and the upper and lower halves 2 and 3 of the cartridge 1 are made of plastic, as described above. If the bevelled portions 80c would not be formed, the frictional chips would be generated to contaminate the write and read surfaces of the disc. Also, stepped portions 2a and 3a are formed on the right side of the right side projections 80 to thereby limit the movement of the shutter with the shutter 6 edges being in abutment with the stepped portions 2a and 3a.

With such an arrangement, it is possible to effectively prevent the displacement of the disc within the cartridge and to effectively prevent the generation of wear of friction chips to avoid the contamination of the disc surfaces.

Figure 19:
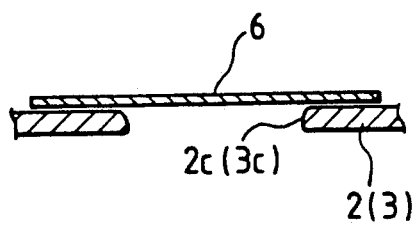
FIG. 19 is a longitudinal sectional view taken along the line XIX—XIX of FIG. 1.
Figure 20:
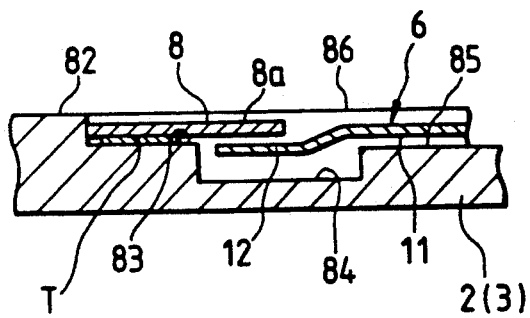
FIG. 20 is a cross-sectional view taken along the line XX—XX of FIG. 4.

Also, the peripheral edges of the head insertion holes 5 and the spindle holes 4 are chamfered to form chamfered portions 2c (3c) so as to avoid the collision of the shutter edges as shown in FIG. 19. This makes it possible to prevent the generation of the frictional chips due to the sliding movement of the shutter. Each retainer plate 8 for guiding the slide portion 12 at the lower edge of the shutter 6 is provided at a position below a reference surface 82 (FIGS. 4 and 20) of the shell half 2 or 3. The retainer plate 8 is attached on a stepped portion 83 through a double-sided adhesive tape T. An extension portion 8a of the retainer plate 8 extends up to an intermediate position above a recess 84. The slide portion 12 of the shutter 6 is located below the extension portion 8a. The planar plate 11 of the shutter 6 is slidingly moved on a stepped portion 85 which is formed below the outer peripheral wall of the shell half (flush with the reference surface 82).

Since the retainer plate 8 is formed below the reference surface of the shell half as described above, when the retainer plate 8 is inserted into a recording and reproducing apparatus (player), there is no risk that the retainer plate 8 would be hooked in the player. Also, since the recess 84 is formed and the extension portion 8a of the retainer plate 8 extends up to the central portion of the recess 84 so that the slide portion 12 is received below the extension portion 8a, it is easy to insert the slide portion 12 below the extension portion 8a and to mount the shutter 6 onto the cartridge.

Figure 21:
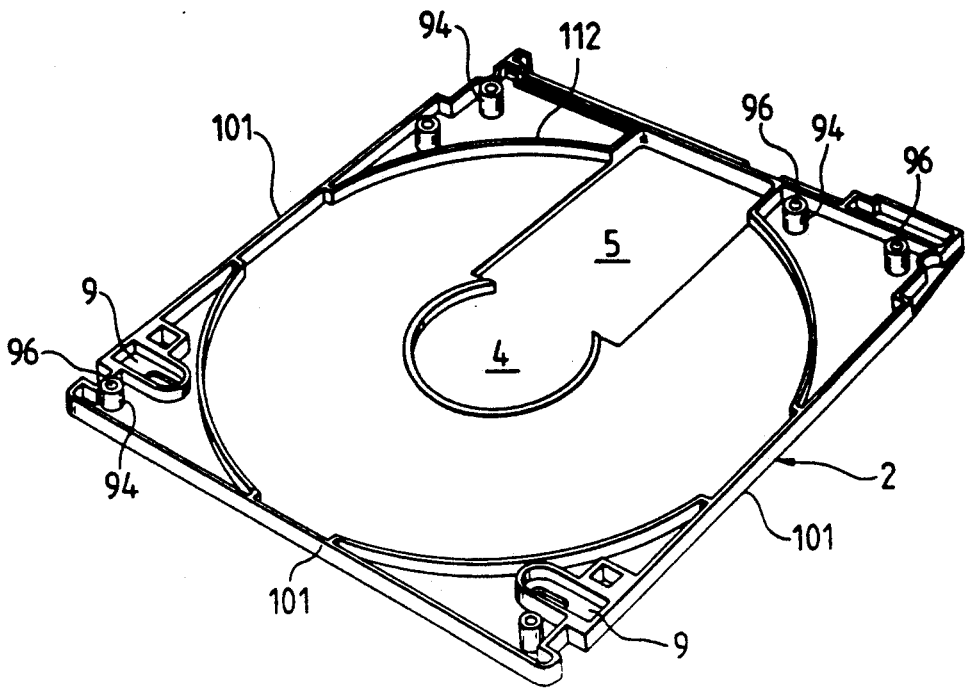
FIG. 21 is a perspective view showing an upper shell half.
Figure 22:
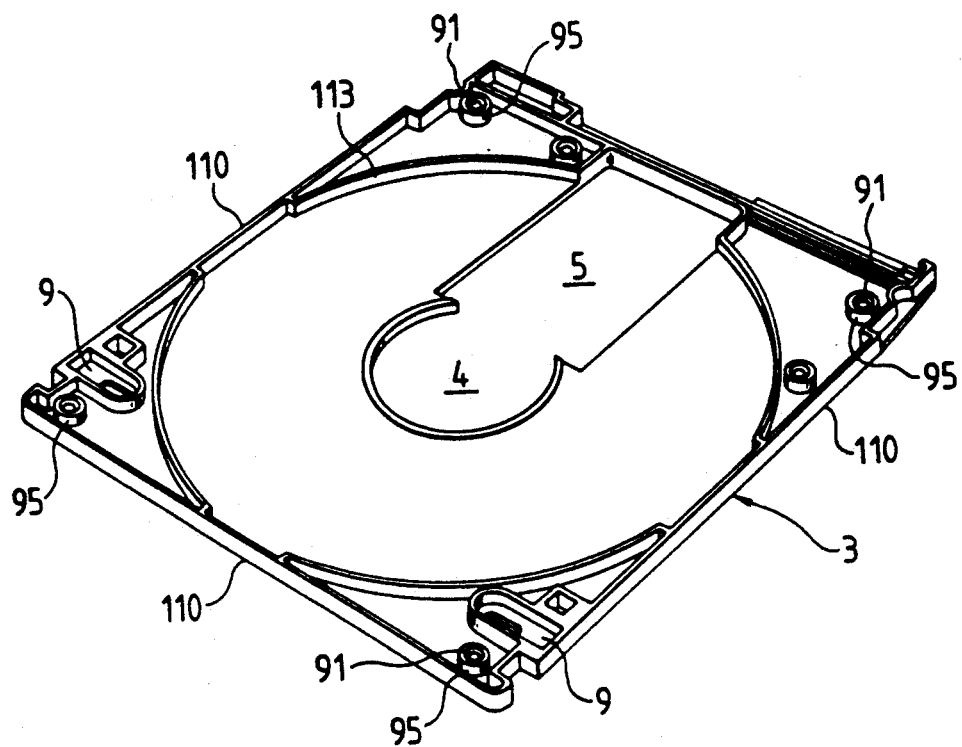
FIG. 22 is a perspective view showing a lower shell half.

A plurality of insertion projections 94, 94, ..., 94 each having a small diameter are provided at desired locations on the upper shell half as shown in FIG. 21. Each of the projections 94 is provided in a central portion with a screw hole 96 for a receiving fastening screw. On the other hand, as shown in FIG. 22, associated projections 95, 95, ..., 95 are formed at positions corresponding to the projections 94 on the lower shell half 3. The receiving projections 95 are each provided with receiving holes 91 for receiving tip ends of the insertion holes 94. Peripheral walls 101 and 110 are formed on peripheries of the shell halves 2 and 3, respectively. These two halves 2 and 3 are provided at the corresponding positions with circular surrounding walls 112 and 113, respectively.

Figure 23:
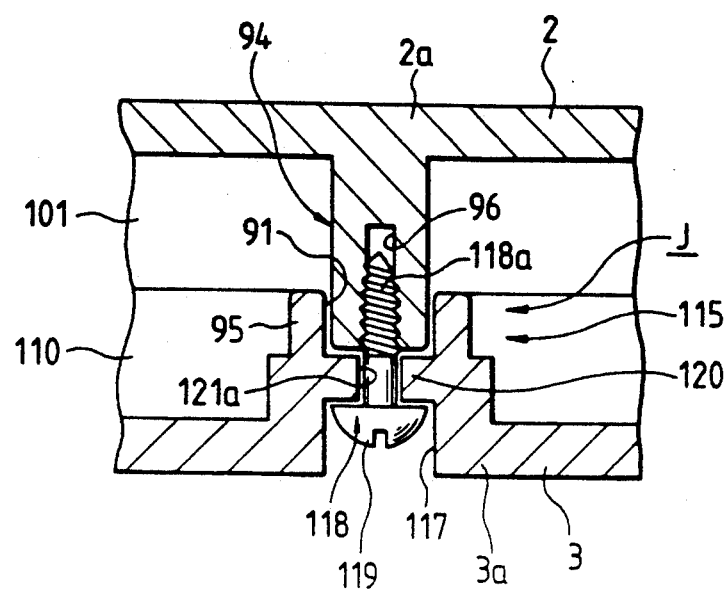
FIG. 23 is a cross-sectional view showing a coupling condition of the shell halves.

The engagement structure between the projections 94 and 95 will now be explained in greater detail with reference to FIG. 23 which shows a cross-section of the coupling projection J. The insertion projection 94 extends from the base plate 2a of the upper shell half 2 toward the base plate 3a of the lower shell half 3 in the vertical direction to exceed a height of the peripheral wall 101 as shown in FIG. 23. Corresponding to a length of the projection 94 exceeding the peripheral wall height, the projection is inserted into the receiving hole 91 of the receiving projection 95 extending from the lower shell half 3. The receiving projection 95 extends to an extent corresponding to a height of the peripheral wall 110. A partitioning wall 120 is provided to the receiving projection 95. The partitioning wall 120 is provided at its central portion with an Insertion hole 121a through which a shaft of the fastening screw 118 is inserted. A screw head 117 is formed opposite the receiving hole 91 with respect to the partitioning wall 120 for receiving the screw head of the fastening screw 118. The screw head 119 is fully received in the receiving hole 117.

When the shell halves 2 and 3 are assembled together, the tip ends of the insertion projections 94 of the upper half 2 are engaged with the receiving holes 91 of the receiving projections 95 of the lower half 3. Under this condition, the screw shafts 118a are inserted into the screw holes 96 of the insertion projections 94 through the insertion holes 121a of the partitioning walls 120 while rotating the fastening screws 118.

Since the tip ends of the insertion projections 94 are inserted into the receiving holes 91 during the assembling of the upper half in this manner, the insertion holes 121a of the partitioning walls 120 are simply aligned with the screw holes 96 of the insertion projections 94 by this operation. Thus, the insertion of the fastening screws 118 may readily be performed. Thus, the assembling of the upper half of the cartridge may readily be performed.

Figure 24:
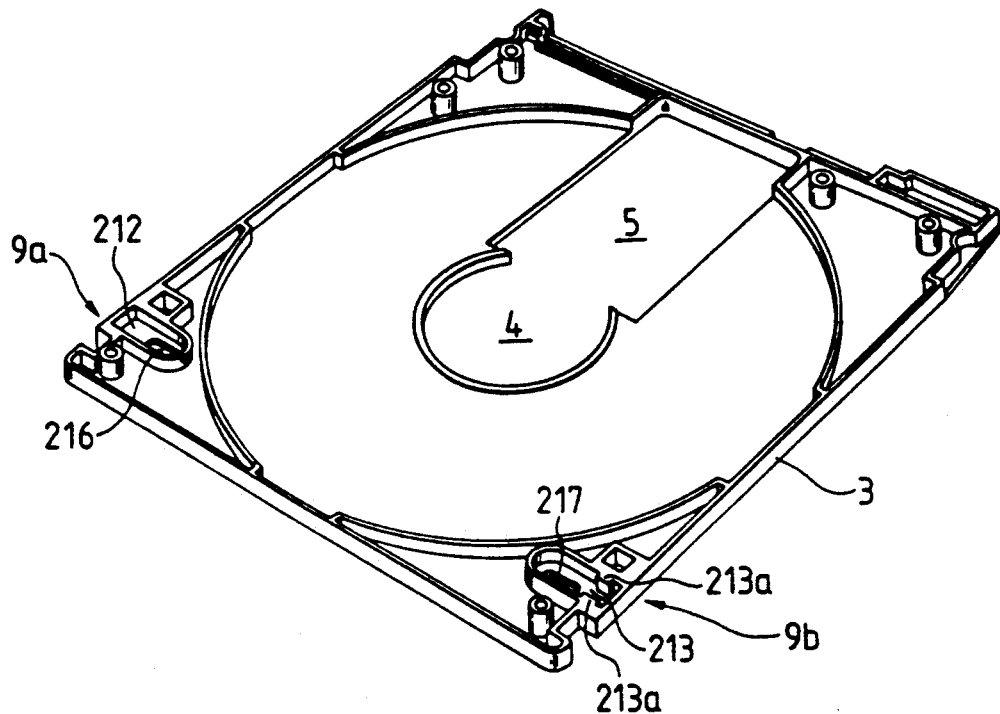
FIG. 24 is a perspective view showing an interior of the lower shell half.

As shown in FIG. 24, write preventing mechanisms 9a and 9b are provided on the lower side portions of the cartridge C. The write preventing mechanisms 9a and 9b are each composed of movable plugs 211, 211 and receiving portions 212, 213 for receiving the movable plugs to be movably right and left as shown in FIG. 25.

The movable plugs 211, 211 are provided with bodies 222 made of plastic and projections 220, 221 each projecting from upper and lower surfaces of the bodies as shown in FIG. 25. In the projection 221, there is formed an insertion hole 223 into which a movable member such as a pin or the like for moving the movable plug is inserted. A pair of retainer legs 225, 225 are extending from a surface of the body 222. Retainer portions 225a are formed at the tip ends of the retainer legs 225. An elasticity providing hole 224 for assisting the elasticity of the legs 225 is provided close to proximal ends of the retainer legs 225.

Figure 26A:
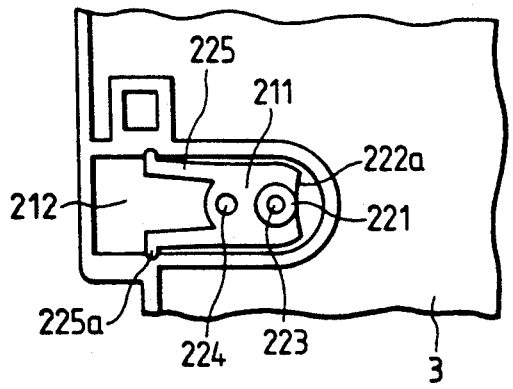
FIGS. 26a and 26b are views showing the moving condition of the movable plugs.
Figure 26B:
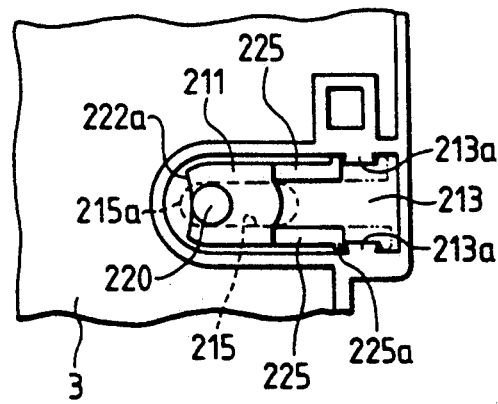

Arcuate recess portions 222a are formed in the vicinity of the portions where the projections 220, 221 are formed. The arcuate recess 222a cooperates with an arcuate surface 215a of an opening 215 formed in the upper half 2 as shown in FIG. 26b. A detection pin on the side of the recording and reproducing apparatus is inserted or a ray of an optical sensor passes through the arcuate recess 222a. When the movable plug of FIG. 26b is moved to the right, the arcuate surface 215a and the arcuate recess surface 215a form a circular through-hole.

Figure 25A:
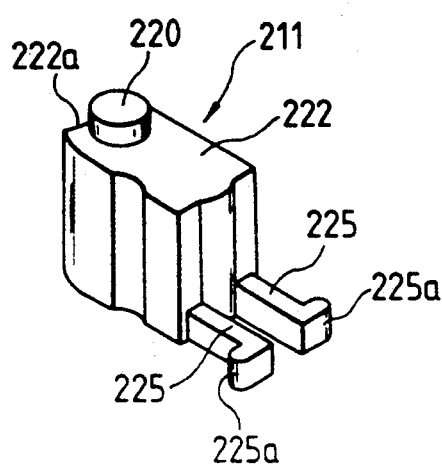
FIGS. 25a and 25b are perspective views showing the movable plugs, respectively.
Figure 25B:
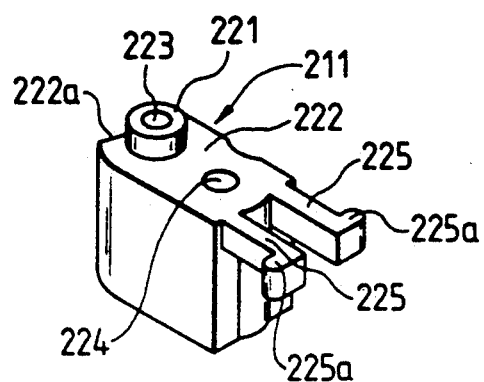

FIG. 24 shows a condition of the lower half 3 from which the upper half 2 of the cartridge has been removed. The movable plug 211 under the condition shown in FIG. 25b is inserted into the left receiving portion 212 (FIG. 26a). The movable plug 211 under the condition shown in FIG. 25a is inserted into the right receiving portion 213 (FIG. 26b). Namely, the projection 220 of the movable plug 211 is engaged with the opening 215 of the receiving portion of the upper half 2, whereas the projection 223 of the movable plug 211 is engaged with the opening 217 of the receiving portion 213. In a peripheral inner surface of the right receiving portion 213, there are formed limiting projections 213a, 213a which cooperate with the retaining legs 225 of the movable plug. In the left receiving portion 212 in FIG. 24, the retaining legs 225 are formed in an upper portion of the movable plug 211, and the retaining legs 225 are engaged with retaining projection (not shown) formed in the upper half 2 in the same manner as in the receiving portion 213 of the lower half.

In this embodiment, the write preventing mechanisms according to the invention are provided for a double-sided operational cartridge. However, it is a matter of course to provide the write preventing mechanism of the invention only to one side of the cartridge.

In operation, in order to prevent the erasing on the upper surface of the disc under the condition shown in FIG. 1, the right write preventing mechanism 9b is operated. Namely, a moving member such as a pin is inserted into the movable member insertion hole 223 formed in the projection 221 of the bottom side movable plug of the write preventing mechanism 9b to thereby move the movable plug 211 rightward in FIG. 1. Thus, the through hole is formed on the left side of the opening 215. The detecting pin P on the side of the recording and reproducing apparatus is inserted into the through hole. This insertion of the detecting pin P into the through hole serves to prevent the double write operation.

With such an arrangement, it is possible to smoothly operate the movable plug without any malfunction.

Also, each of the limiting projection 213a has a width to some extent. If the movable plug 211 is stopped in an intermediate position, then the operator may feed this stop. Thus, the movable plug 211 may be fed to the predetermined position without fail.

Figure 27:
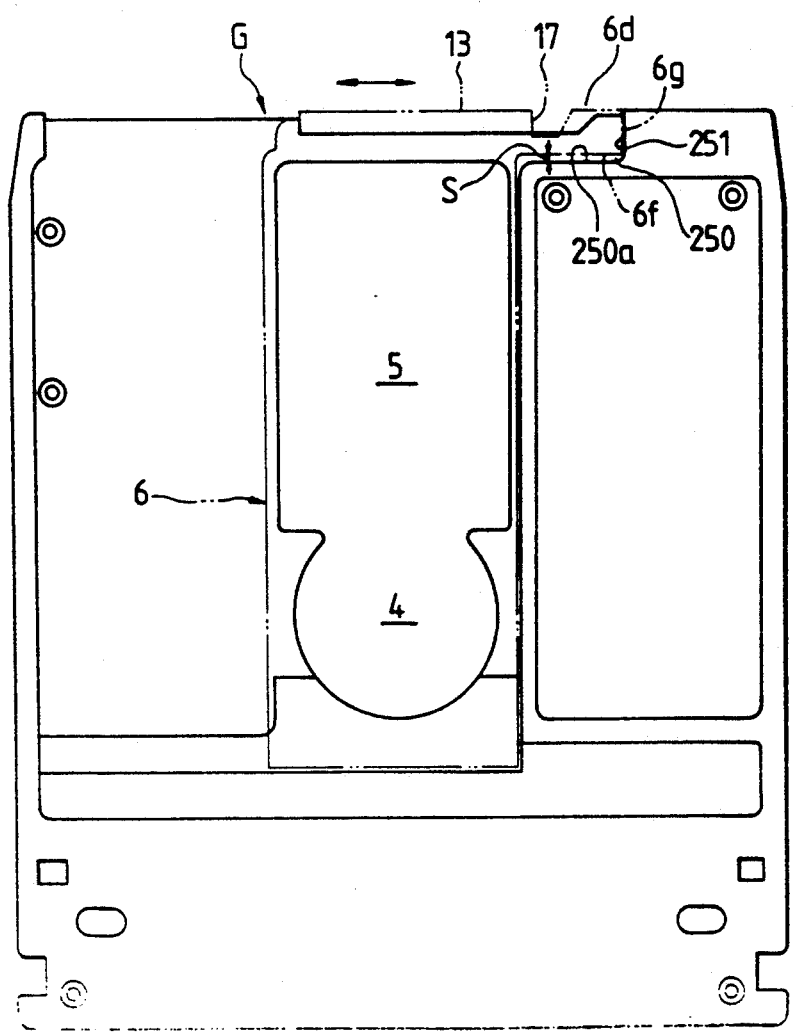
FIG. 27 is a plan view showing a cartridge according to another embodiment of the invention.

As shown in FIG. 27, a guide recess 250 is provided in the guide portion G on the front edge of the shell halves. The guide recesses 250 serves to guide a projection 6d extending in the lateral direction from the head portion 13 of the shutter 6. The opening and closing pin insertion hole 17 into which the opening and closing pin of the recording and reproducing apparatus for opening and closing the shutter 6 is formed in the projection 6d, the opening and closing pin insertion hole 17 being engaged with the pin insertion hole 19 of the slider (see FIG. 2). A front end 6g of the projection 6d of the head portion 13 is brought into contact with the vertical side of the guide recess 251. The opposite side 6f confronting a guide recess defining side 250 forming the lower side of the projection 6d is confronted with the defining side 250 at a sufficient interval S.

As described above, since the interval between the confronting side 6f of the projection 6d of the head portion of the shutter and the defining side 250a of the guide recess 250 for guiding the head portion is sufficiently increased, when the shutter 6 performs the opening and closing operation, the confronting side 6f is not brought into contact with the defining side 250a, and it is possible to prevent the generation of the frictional chips concomitant with the lateral movement of the shutter 6.

Figure 28:
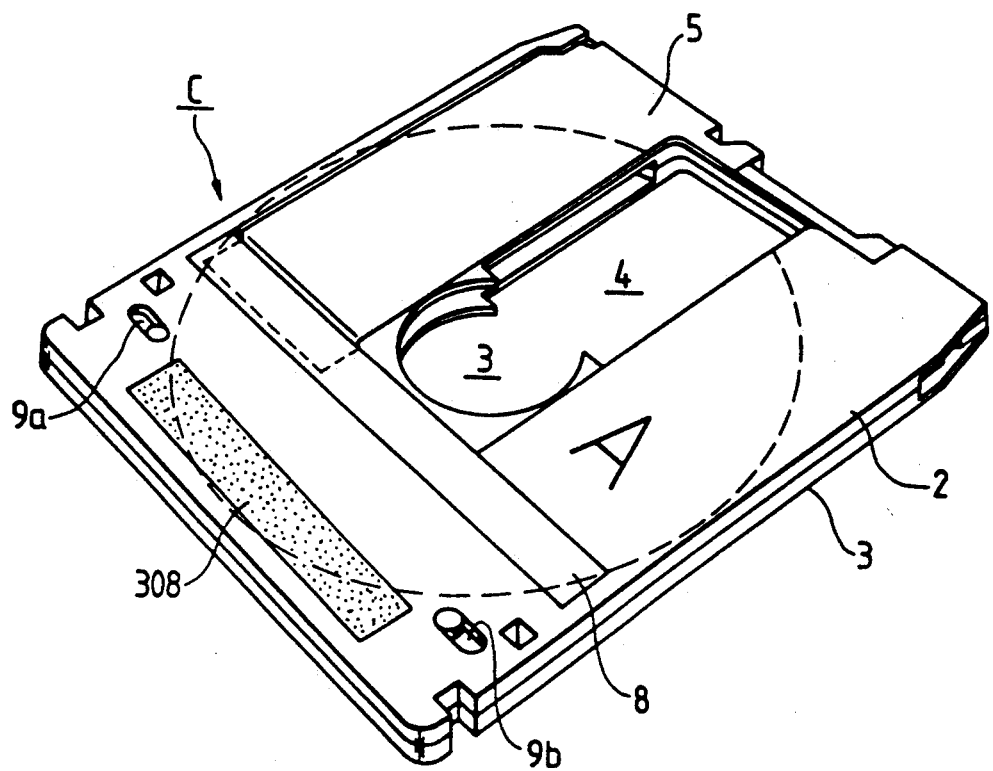
FIGS. 28 and 29 are perspective views showing a cartridge according to another embodiment of the invention, respectively.
Figure 29:
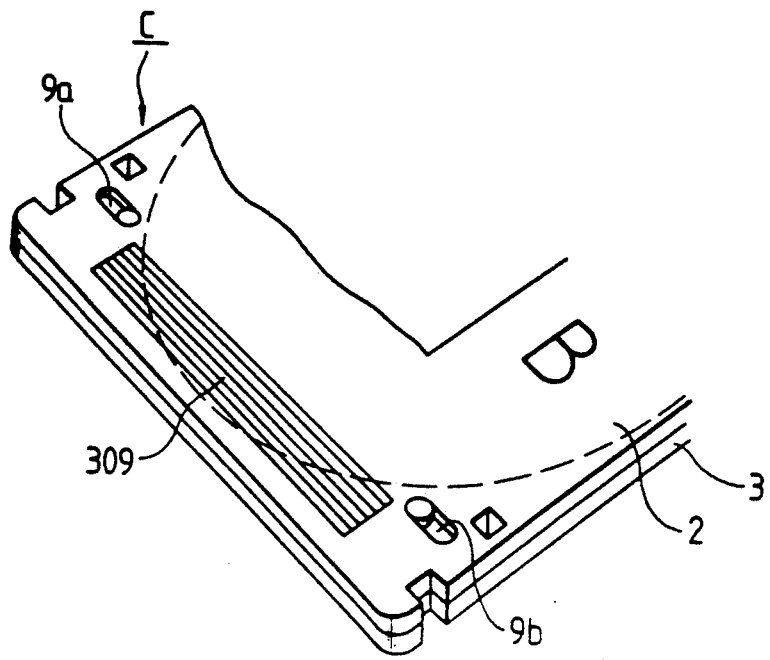

As shown in FIGS. 28 and 29, a distinction indicating portion 308 having a sand-mesh surface is provided on a A-side of the cartridge which is held by the operator's fingers. The distinction indicating portion 308 is in the form of a rectangular shape extending in the lateral direction of the cartridge. On the bottom side corresponding to the position of the rectangular distinction indicating portion 308, i.e., the B-side surface of the lower half 3, there is formed a B-side distinction indicating portion 309 formed of a number of stripes. The B-side distinction indicating portion 309 is also in the form of a thin rectangular shape.

As described above, since the different surface indicating portions for the Aside and B-side are formed on the cartridge, the operator may readily recognize that the cartridge held by the operator is of the double-sided disc type without fail, and at the same time, whether the disc surface to be used is either one of the A-side or B-side.

What is claimed is:

1. A cartridge case for encasing therein a recording medium disc, said cartridge being made of plastic and having a front edge;

a shutter slidably mounted on said cartridge case for opening and closing at least one head insertion hole formed in said cartridge case, said shutter including a head portion slidingly movable along said front edge of said cartridge, said head portion having opening and closing plate portions extending from both sides thereof;

a guide portion formed in said front edge of said cartridge case in an insertion direction toward a recording and reproducing apparatus;

a slider slidingly engaged with said guide portion for supporting said shutter; and a return coil spring, for biasing said shutter through said slider to a position where said shutter closes said head insertion hole, provided in a receiving space at a corner of the cartridge case, wherein said return coil spring comprises an elastic wire coiled portion and two arms extend from said coiled portion, one of the arms including a first extension portion extending substantially along a circumferential periphery of the disc from said coiled portion and a second extension portion bent from said first extension portion along a front wall in the insertion direction of the recording and reproducing apparatus for the cartridge, said second extension portion having a longitudinal portion extending along the front wall, a laterally extending portion bent back from the longitudinal portion and a retainer portion engaged with an end portion of the slider and bent at a right angle from the laterally extending portion, a distal end of said second extension portion being engaged with a tip end of said slider, and the other arm includes a third extension portion extended from said coiled portion toward the front wall and a fourth extension portion bent from said third extension portion toward the front wall of said cartridge, case, said fourth extension portion having a trapezoidal crest shape cooperating with the third engaging with an end wall of the cartridge, said retainer portion of the fourth extension portion being extended in a direction opposite to that of said retainer of the second extension portion, a distal end of said fourth extension portion being engaged with the front wall of said cartridge case.

2. A disc cartridge according to claim 1, wherein a radius of curvature of a bent portion between said third extension portion and said fourth extension portion is in the range of 0.8 to 3 mm.

* * * * *